United States Patent
Kosuge et al.

(10) Patent No.: US 9,481,311 B2
(45) Date of Patent: Nov. 1, 2016

(54) ACCESSORY MOUNTING STRUCTURE TO VEHICLE DASHBOARD

(71) Applicant: KAWASAKI JUKOGYO KABUSHIKI KAISHA, Hyogo (JP)

(72) Inventors: Hideyoshi Kosuge, Kobe (JP); Chad Enger, Lincoln, NE (US)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 45 days.

(21) Appl. No.: 14/580,813

(22) Filed: Dec. 23, 2014

(65) Prior Publication Data

US 2016/0176352 A1    Jun. 23, 2016

(51) Int. Cl.
*B60R 7/06* (2006.01)

(52) U.S. Cl.
CPC ........................................ *B60R 7/06* (2013.01)

(58) Field of Classification Search
CPC .................................. B60R 7/06; B62D 27/02
USPC ....................... 296/37.12, 192, 70, 1.06, 1.07
See application file for complete search history.

(56) References Cited

U.S. PATENT DOCUMENTS

| | | | | |
|---|---|---|---|---|
| 6,158,802 A | * | 12/2000 | Akagi | B60R 11/00 200/296 |
| 2004/0124317 A1 | * | 7/2004 | Wallaker | B60R 11/02 248/27.1 |
| 2008/0315612 A1 | * | 12/2008 | D'Alessandro | B60R 11/00 296/72 |
| 2009/0174213 A1 | * | 7/2009 | Robertson | B62D 25/24 296/70 |

* cited by examiner

*Primary Examiner* — Jason S Morrow
*Assistant Examiner* — E Turner Hicks
(74) *Attorney, Agent, or Firm* — Wenderoth, Lind & Ponack, L.L.P.

(57) ABSTRACT

An accessory mounting structure to a vehicle dashboard, the structure includes: a dashboard extending in a vehicle width direction at a front portion of a riding space and provided with an accessory location opening for locating an accessory; and an accessory mount panel detachably provided to the dashboard and closing the accessory location opening. The accessory mount panel has an accessory mount portion for mounting the accessory that is located through the accessory location opening.

7 Claims, 10 Drawing Sheets

ACCESSORY MOUNTING STRUCTURE TO VEHICLE DASHBOARD

BACKGROUND OF THE INVENTION

1. Field of the Invention

The present invention relates to an accessory mounting structure to a vehicle dashboard.

2. Description of the Related Art

Conventionally, a vehicle can additionally have a selective accessory required by each user. Examples of such an accessory include an audio unit, a fog lamp or the like. A dashboard can be mounted with the accessory such as the audio unit or a switch or the like for controlling the fog lamp.

In a known accessory mounting structure to a dashboard, the dashboard is preliminarily provided with a mount opening corresponding to an accessory, and an opening cover configured to close the mount opening is attached to the mount opening in a standard state (where the accessory is not added). When the accessory is added, the opening cover is detached and the accessory is mounted to the mount opening.

In another known accessory mounting structure, a dashboard itself is detached from a vehicle and is processed to form a mount opening, an accessory is mounted directly to the mount opening, and the dashboard mounted with the accessory is then assembled to the vehicle.

SUMMARY OF THE INVENTION

The former method requires preliminary provision of a mount opening corresponding to an additional accessory and an opening cover configured to close the opening. A plurality of openings and a plurality of covers are necessary in accordance with kinds and the number of accessories, which leads to increase in cost. The latter method requires work of detaching and attaching the dashboard from and to the vehicle, which inhibits easy addition of accessories.

The present invention has been made in view of the problems mentioned above, and an object thereof is to provide an accessory mounting structure that improves workability of mounting an accessory to a vehicle dashboard with no increase in cost.

In order to achieve the object, the present invention provides an accessory mounting structure to a vehicle dashboard, the structure including: a dashboard extending in a vehicle width direction at a front portion of a riding space and provided with an accessory location opening for locating an accessory; and an accessory mount panel detachably provided to the dashboard and closing the accessory location opening; wherein the accessory mount panel has an accessory mount portion for mounting the accessory that is located through the accessory location opening.

The above configuration enables mounting of an accessory of any kind via an accessory mount panel that is detachably provided to the dashboard, needs none of detaching and attaching the dashboard from and to the vehicle, and thus improves accessory mounting workability.

The accessory mounting structure to the vehicle dashboard preferably has any of the following configurations.

(1) The accessory mount panel has a break guide configured to guide breaking of the accessory mount panel correspondingly to a mounting shape of the accessory, and the accessory mount portion is provided as an accessory mount opening that is formed by breaking the accessory mount panel along the break guide.

In the configuration (1), the accessory mount portion can be easily provided as the accessory mount opening that is formed by breaking the accessory mount panel along the break guide. Furthermore, the dashboard needs not preliminarily have a mount opening for each accessory, and no opening cover configured to close the mount opening needs to be provided preliminarily. This configuration prevents increase in cost.

(2) The accessory mount panel is made of resin.

In the configuration (2), the break guide can be easily broken to easily provide the accessory mount opening.

(3) The break guide is provided on a reverse surface of the accessory mount panel, opposite to a obverse surface facing the riding space.

In the configuration (3), the break guide does not appear on the obverse surface of the accessory mount panel facing the riding space, and is thus harmless to outer appearance of the accessory mount panel.

(4) The structure further includes a mount bracket configured to mount the accessory to the accessory mount panel, the accessory being mounted to the accessory mount panel has a flange that is located on the obverse surface facing the riding space and is larger than the accessory mount opening, and the accessory is mounted to the accessory mount panel when the flange and the mount bracket sandwich the accessory mount panel in a thickness direction.

In the configuration (4), the flange and the mount bracket sandwich the accessory mount panel in the thickness direction, and the accessory can be thus mounted firmly to the accessory mount panel.

(5) The accessory mount panel is attached by engagement at an engagement portion, to a periphery of the accessory location opening.

In the configuration (5), the accessory mount panel can be detachably attached to the periphery of the accessory location opening.

(6) The dashboard has a center console provided adjacent to the accessory location opening, and the accessory mount panel has a frame surrounding the center console and attached, by engagement at an engagement portion, to a periphery of the center console.

In the configuration (6), the frame improves rigidity of the accessory mount panel. Furthermore, the frame is attached to the periphery of the center console by engagement at the engagement portion. This increases the number of engagement portions of the accessory mount panel to the dashboard. The accessory mount panel can be thus attached more firmly to the dashboard.

(7) The dashboard has a rear boss on a reverse surface opposite to a obverse surface facing the riding space, and the accessory mount panel is further fastened by a screw to the rear boss.

In the configuration (7), the accessory mount panel can be attached more firmly to the dashboard by screw fastening in addition to the engagement at the engagement portion.

The accessory mounting structure to the vehicle dashboard according to the present invention thus improves workability of mounting the accessory to the vehicle dashboard with no increase in cost.

DETAILED DESCRIPTION OF THE INVENTION

FIGS. 1 to 12 each show a utility vehicle including an accessory mounting structure to a vehicle dashboard according to the present invention. An embodiment of the present invention will now be described with reference to these figures. For easier description, assume that the utility vehicle travels "forward" with respect to the utility vehicle and respective components, and right and left sides of a crew correspond to "right and left sides" of the utility vehicle and the respective components. These figures are schematic and dimensional ratios therein are different from the actual dimensions.

Figure 1:
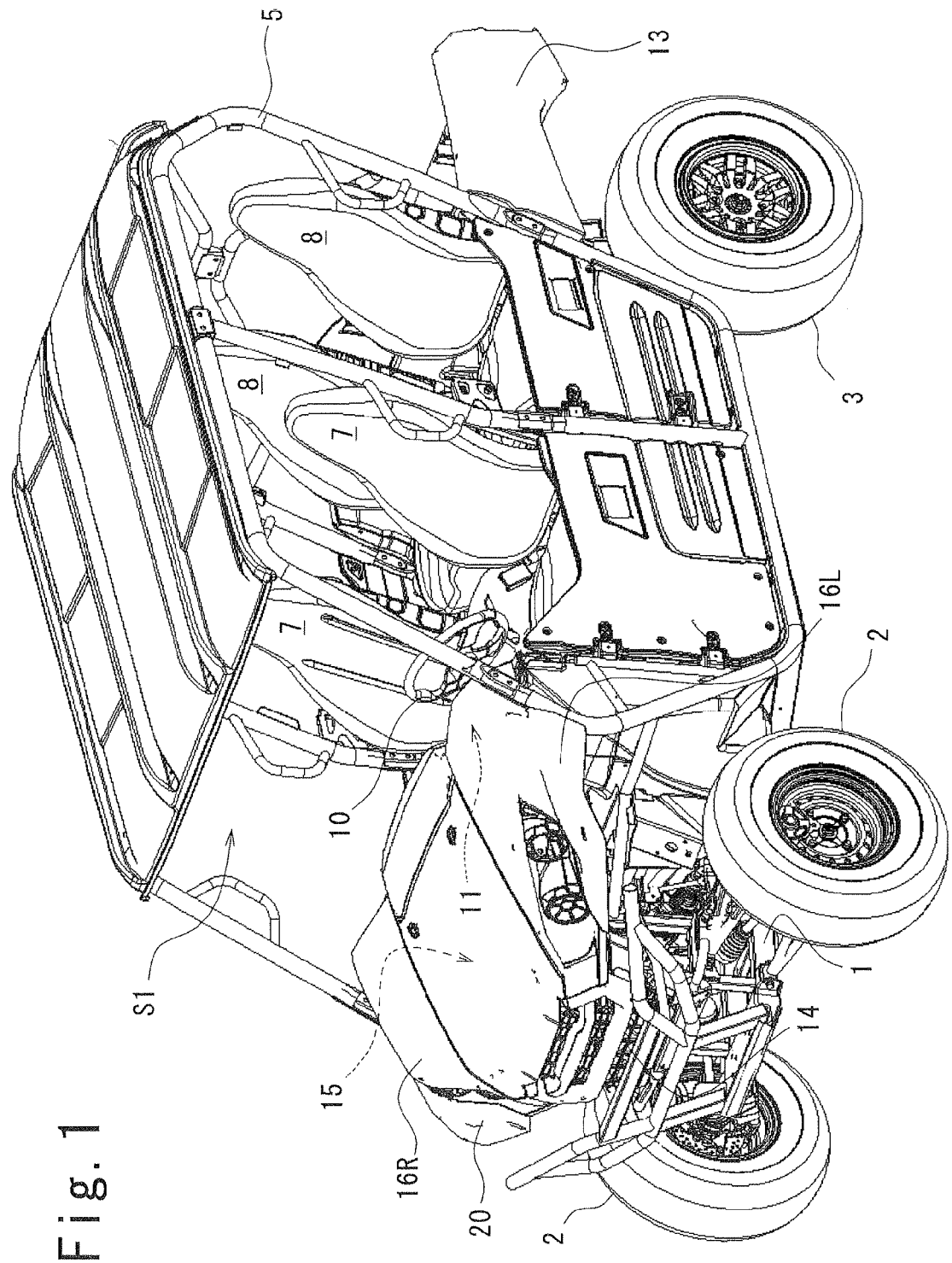
FIG. 1 is an overall perspective view of a utility vehicle.

As shown in FIG. 1, the utility vehicle includes a chassis frame 1, right and left front wheels 2 located at the front end of the chassis frame 1, and right and left rear wheels 3 located at the rear end of the chassis frame 1. A riding space S1 is located between the front wheels 2 and the rear wheels 3 in the anteroposterior direction, and is surrounded with a R.O.P.S. 5. The riding space S1 accommodates right and left front seats 7 and right and left rear seats 8. A steering wheel 10 and a dashboard 11 are provided at the front end of the riding space S1, and an engine (not shown) is located below the front seats 7. The R.O.P.S. is an abbreviation for a rollover protective structure.

The utility vehicle further includes a carrier 13 located behind the riding space S1, and a front cover assembly 20 located ahead of the riding space S1 and covering a front chamber 15 as well as right and left wheel housings 16R and 16L. The front chamber 15 accommodates a radiator 14 for an engine coolant located at the front end.

Figure 2:
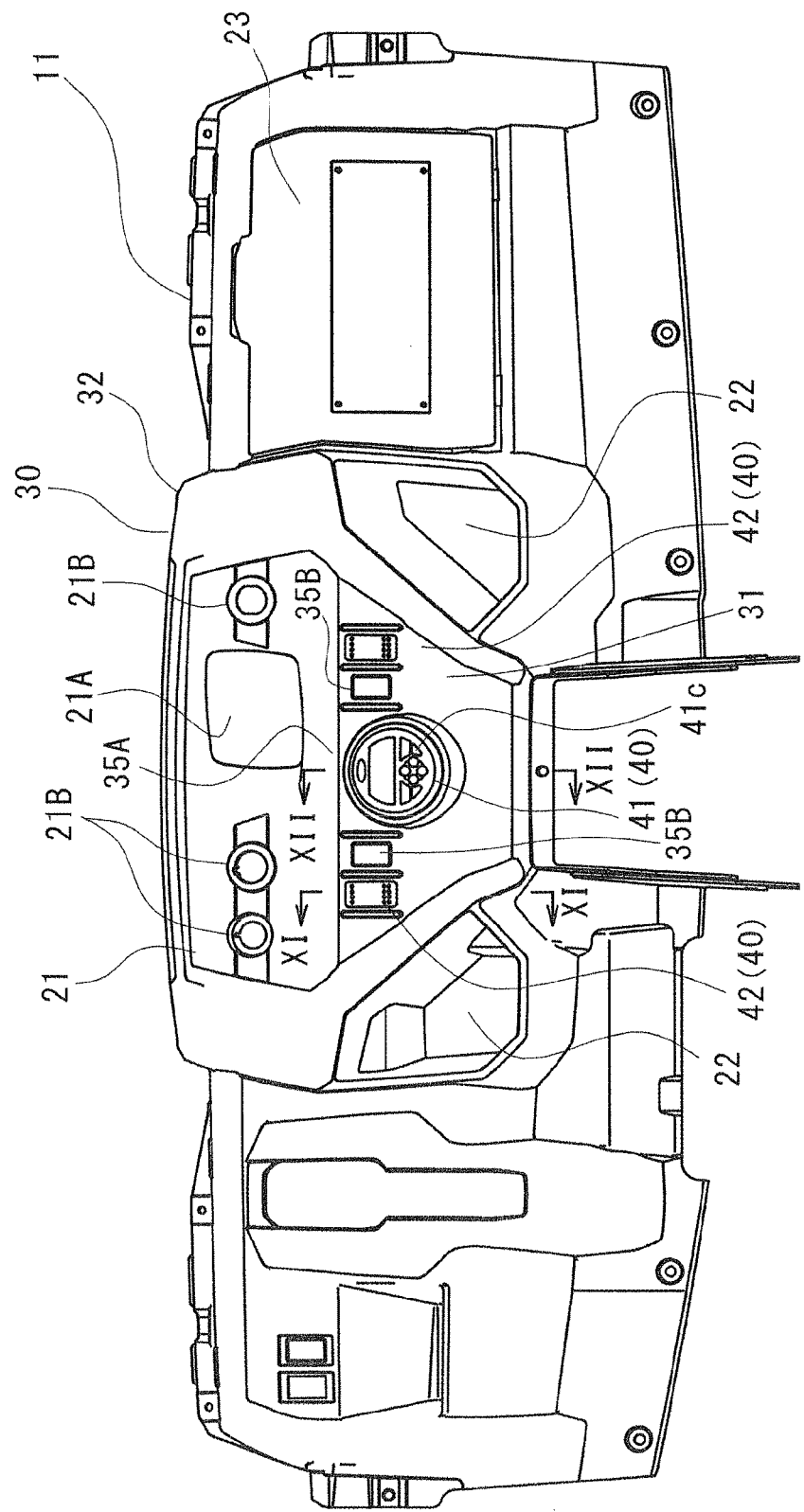
FIG. 2 is a front view of a dashboard viewed from a riding space.

FIG. 2 is a front view from the riding space S1, of the dashboard 11 mounted with accessories. The steering wheel 10 is not shown in this figure. The following description is made on the assumption that the dashboard 11 has a obverse surface facing the riding space S1, and a reverse surface (facing the front chamber 15) opposite to the obverse surface. As shown in FIG. 2, the dashboard 11 extends in the vehicle width direction, and includes a center console 21 located at the top in the center in the vehicle width direction, an accessory mount panel 30 surrounding the periphery of the center console 21 and located therebelow, a pair of right and left recess portions 22 and 22 located at respective ends of the accessory mount panel 30 in the vehicle width direction, and a glove compartment 23 located on the right.

The center console 21 is provided with a meter unit 21A indicating various driving information such as vehicle speed and engine rotational speed, and a plurality of control dials 21B, for example. The recess portions 22 are each mounted with a speaker (not shown) corresponding to an audio unit 41, for example.

The accessory mount panel 30 is a resin plate member to be mounted with an accessory 40 of any kind. The accessory mount panel 30 has a panel body 31 mounted with the accessory 40 and a frame 32 extending upward from the panel body 31 and surrounding the center console 21. The frame 32 is continuously provided above the panel body 31 to improve rigidity of the accessory mount panel 30.

The accessory mount panel 30 according to the present embodiment is mounted with the substantially cylindrical audio unit 41 and a substantially rectangular switch 42 for a fog lamp (not shown). The accessory mount panel 30 is detachably engaged to the dashboard 11 at a plurality of positions by engagement of clips or the like.

Figure 3:
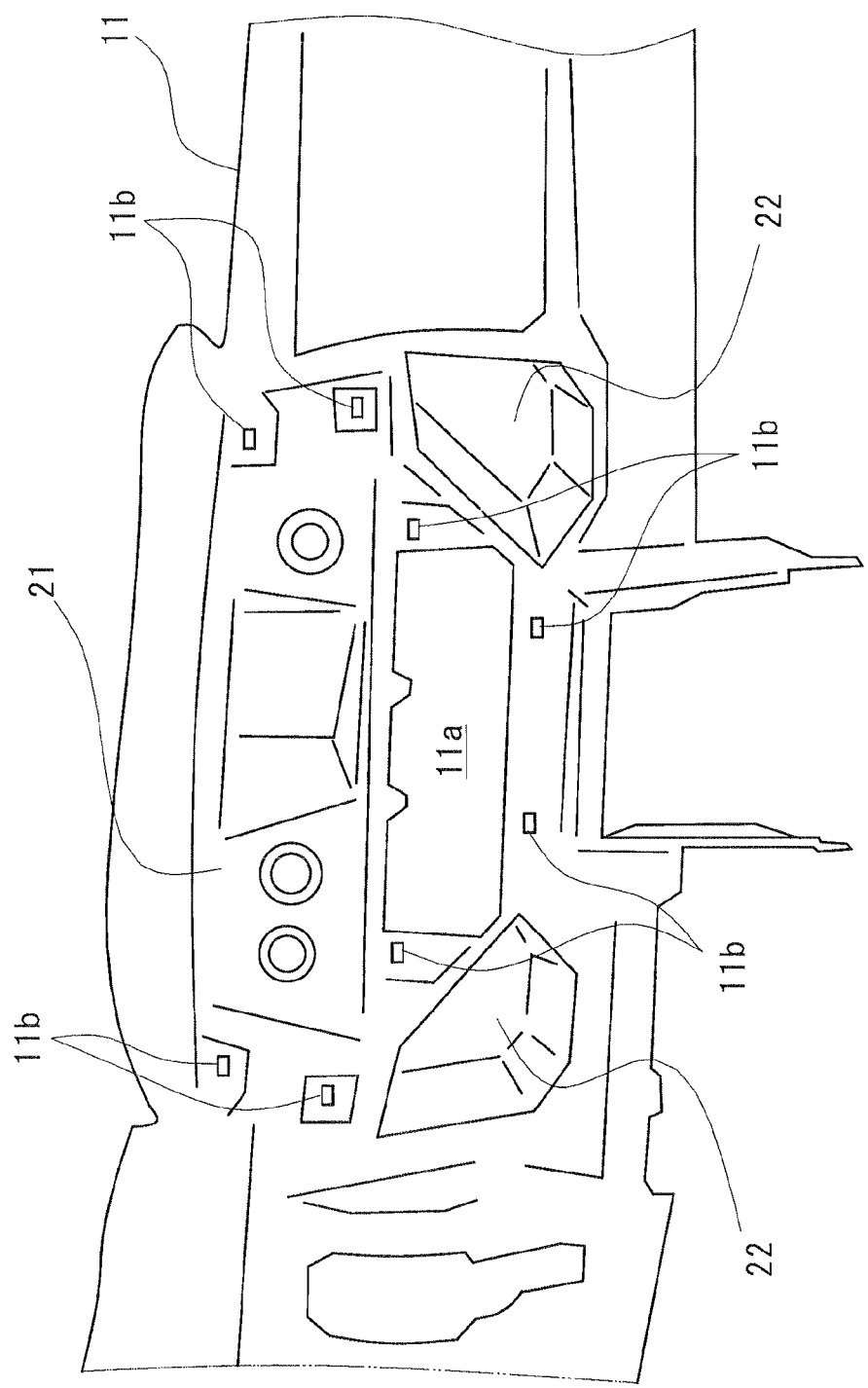
FIG. 3 is a front view of the dashboard alone.

FIG. 3 shows the dashboard 11 in a state where the accessory mount panel 30 is detached from the state shown in FIG. 2. With reference also to FIG. 3, the dashboard 11 is provided with an opening 11a (accessory location opening) at a position corresponding to the panel body 31. In the state where the accessory mount panel 30 is attached to the dashboard 11, the opening 11a is closed by the panel body 31 and the accessory 40 of any kind mounted to the panel body 31 is located through the opening 11a.

Figure 4:
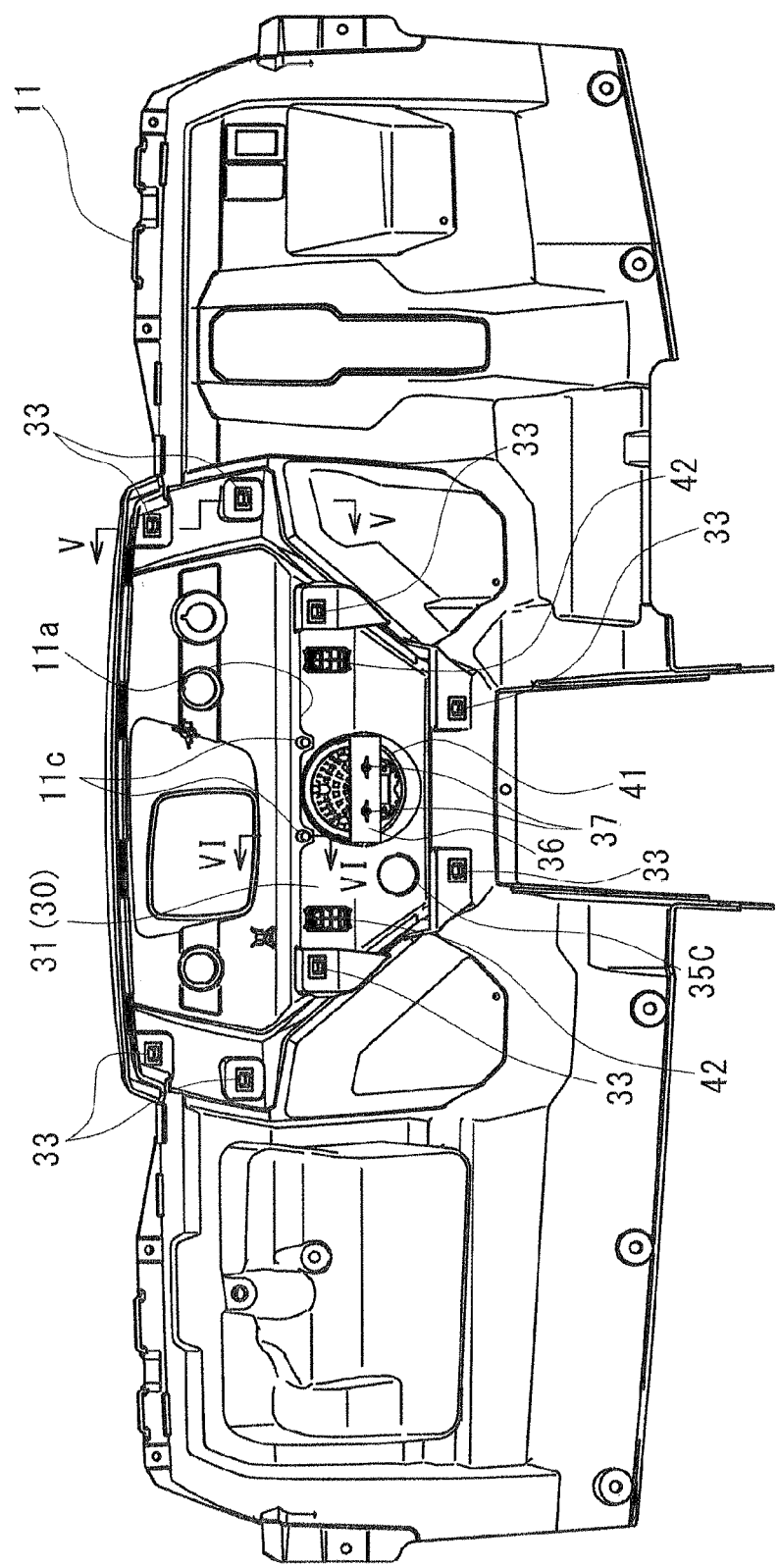
FIG. 4 is a rear view of the dashboard viewed from a front chamber.

FIG. 4 is a rear view, viewed from the front chamber 15, of the reverse surface of the dashboard 11 mounted with accessories. As shown in FIG. 4, the accessory mount panel 30 is detachably engaged to the dashboard 11 at totally eight engagement portions 33, . . . , 33, more specifically, at paired upper and lower four positions at the right and left portions of the frame 32, and paired upper and lower four positions at the right and left portions of the accessory mount portion.

Figure 5A:
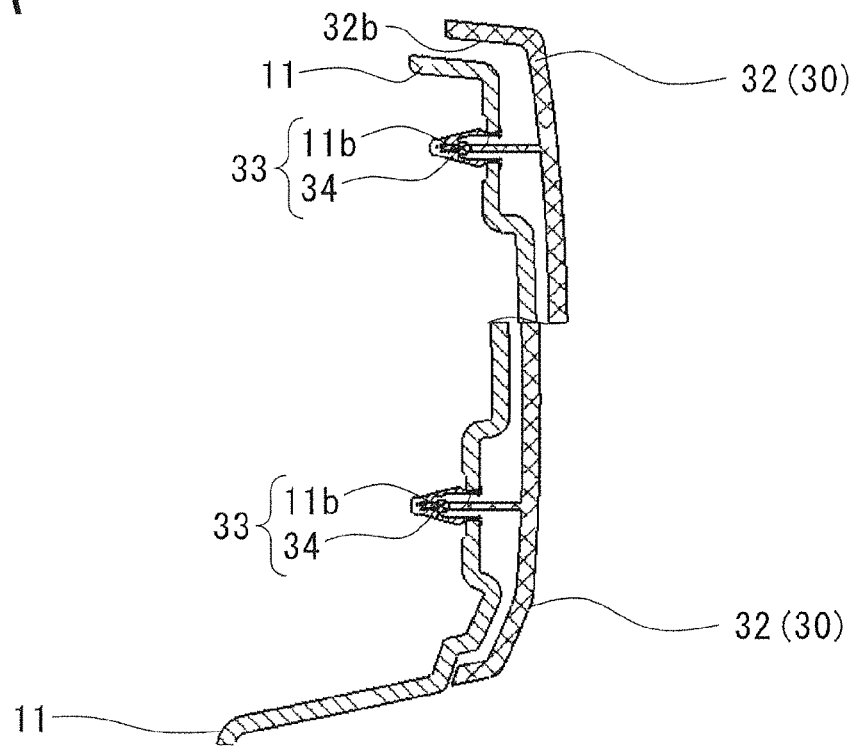
FIG. 5A is a sectional view taken along line V-V indicated in FIG. 4.

Engagement of the accessory mount panel 30 to the dashboard 11 is described by exemplifying the engagement portions 33 on the left of the frame 32. FIG. 5A is a sectional view of the engagement portions, taken along line V-V indicated in FIG. 4. As shown in FIG. 5A, the engagement portions 33 each include a clip engagement hole 11b (see also FIG. 3) provided in the dashboard 11, and a clip 34 provided to be directed forward from a reverse surface 32b of the accessory mount panel 30. The clip 34 is inserted and locked to the clip engagement hole 11b, so that the accessory mount panel 30 is coupled and engaged to the dashboard 11.

Figure 5B:
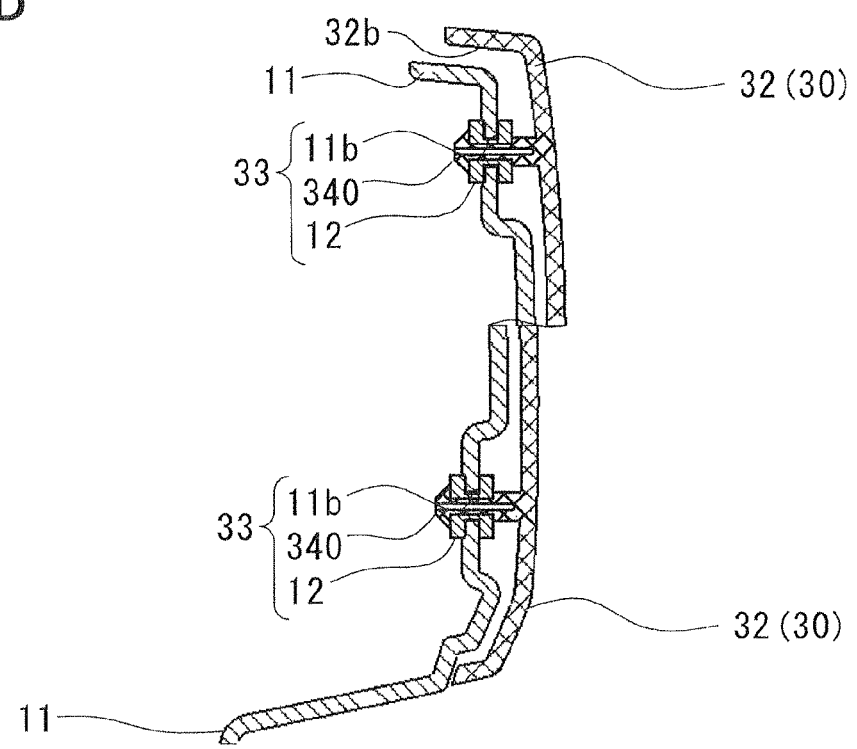
FIG. 5B is a sectional view taken along line V-V indicated in FIG. 4, according to a modification example of FIG. 5A.

As shown in FIG. 5B, the accessory mount panel 30 can be alternatively attached to the dashboard 11 via a grommet 12. More specifically, the grommet 12 serving as an elastic member (e.g. rubber) is fitted to the clip engagement hole 11b in the dashboard 11, and a clip 340 is inserted and locked to a clip engagement hole 12a in the grommet 12. The clip 340 is provided to be directed forward from the reverse surface 32b of the accessory mount panel 30. The distal end of the clip 340 inserted to the grommet 12 is opened and the grommet 12 is sandwiched between the distal end and the proximal end of the clip 340. The clip 340 is elastically supported by the grommet 12 and is positionally regulated in forward and backward, rightward and leftward, and upward and downward directions. Backlash of the accessory mount panel 30 relative to the dashboard 11 is thus reduced, and vibration and noise generated due to such attachment backlash is thus suppressed.

Figure 6:
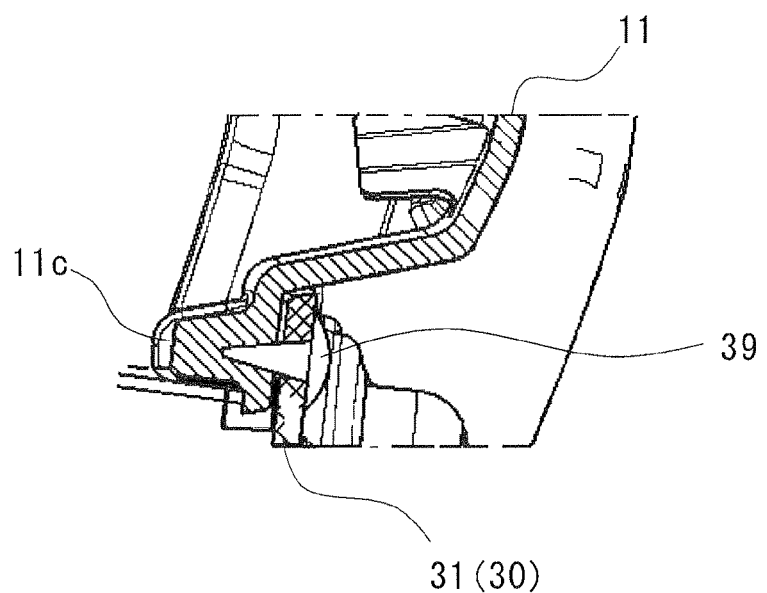
FIG. 6 is a sectional view taken along line VI-VI indicated in FIG. 4.

Still alternatively, the accessory mount panel 30 can be fixed by fastening to the dashboard 11 so as to reinforce attachment of the accessory mount panel 30 to the dashboard 11. FIG. 6 is a sectional view taken along line VI-VI indicated in FIG. 4. As shown in FIG. 6, the dashboard 11 is provided with a rear boss 11c. A tapping screw 39 is fastened to the rear boss 11c through the accessory mount panel 30 so as to reinforce attachment of the accessory mount panel 30 to the dashboard 11. The accessory mount panel 30 can be thus attached firmly to the dashboard 11 even in a case where the accessory mount panel 30 is mounted with the heavy audio unit 41 (see FIG. 2).

Figure 7:
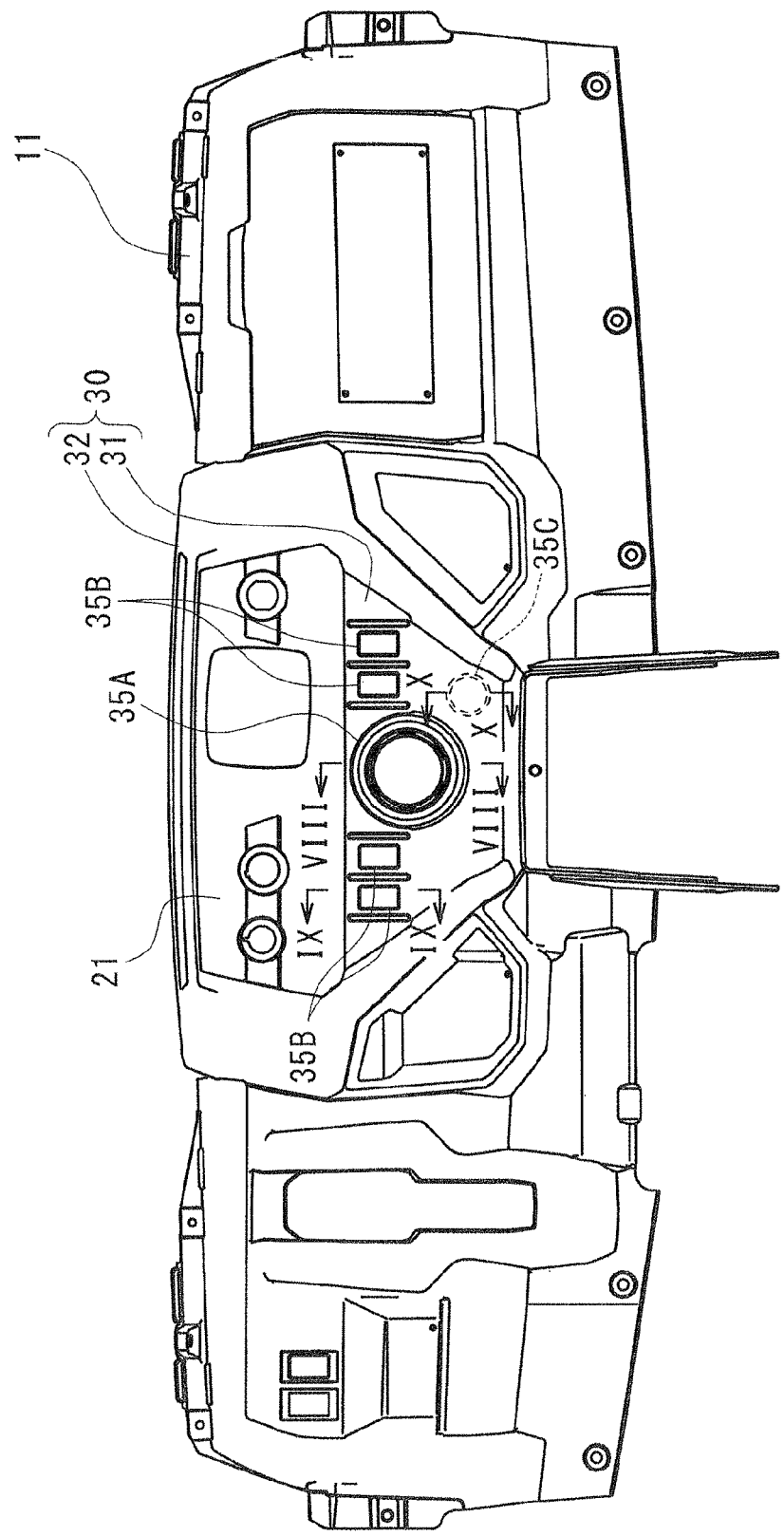
FIG. 7 is a front view of the dashboard mounted with no accessory.

FIG. 7 is a front view of the dashboard similar to FIG. 2, in a state where the panel body 31 is mounted with no accessory 40 (see FIG. 2). As shown in FIG. 7, the panel body 31 is preliminarily provided, at a plurality of positions, with break guides 35A to 35C configured to guide breaking corresponding to the mounting shapes of the accessories 40. The accessory mount panel 30 is made of resin. The panel body 31 is broken (or cut off) along the break guides 35A to 35C to easily form accessory mount openings 37A to 37C (see FIGS. 10 to 12) serving as accessory mount portions to be mounted with the accessories 40.

More specifically, the panel body 31 is provided, on the obverse surface, with the break guide 35A in a substantially circular shape corresponding to the audio unit 41 and the break guides 35B in a substantially rectangular shape corresponding to the switch 42. The break guides 35B are provided at a plurality of positions on respective sides of the break guide 35A substantially symmetrically about the break guide 35A, so as to be harmless to outer appearance of the panel body 31. The panel body 31 is provided, in a rather right portion of the reverse surface, with the break guide 35C in a substantially circular shape. The break guide 35C can be mounted with an auxiliary connector (not shown), such as a universal serial bus (USB) port, to be connected with an external device (not shown).

More specifically, the panel body 31 is provided with the plurality of break guides 35A to 35C. A selected one of the break guides 35A to 35C is broken correspondingly to the accessory 40 required by a user, so as to easily form a corresponding one of the accessory mount openings 37A to 37C serving as an accessory mount portion to be mounted with the accessory 40. The plurality of accessory mount openings 37A to 37C thus needs not be provided preliminarily so as to correspond to the plurality of accessories 40. This configuration does not require preliminary provision of the opening covers configured to close the preliminarily provided openings.

Figure 8:
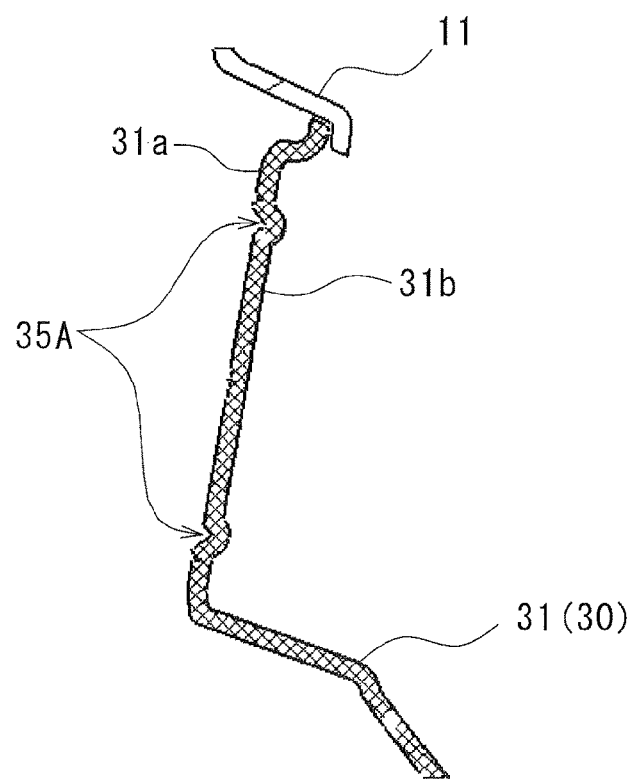
FIG. 8 is a sectional view taken along line XIII-XIII indicated in FIG. 7.
Figure 9:
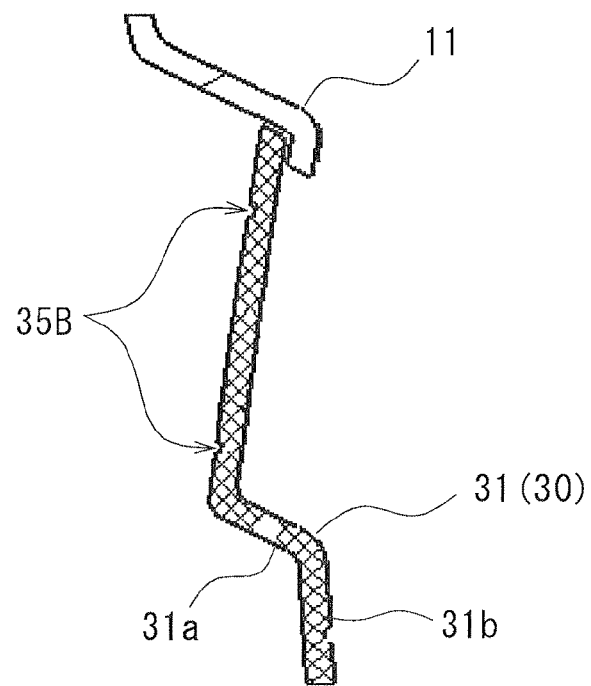
FIG. 9 is a sectional view taken along line IX-IX indicated in FIG. 7.
Figure 10:
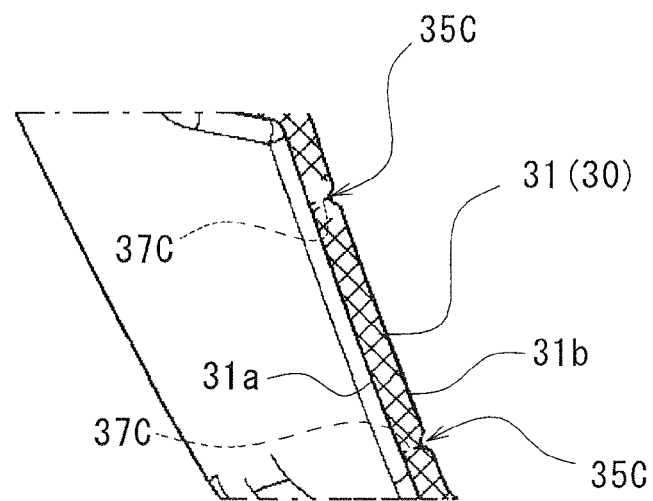
FIG. 10 is a sectional view taken along line X-X indicated in FIG. 7.

The respective break guides 35A to 35C are detailed with reference to FIGS. 8 to 10. FIG. 8 is a sectional view of the break guide 35A taken along line VIII-VIII indicated in FIG. 7. FIG. 9 is a sectional view of the break guide 35B taken along line IX-IX indicated in FIG. 7. FIG. 10 is a sectional view of the break guide 35C taken along line X-X indicated in FIG. 7.

As shown in FIG. 8, the break guide 35A is recessed from a obverse surface 31a of the panel body 31 toward a reverse surface 31b. The break guide 35A is provided as a recess portion when viewed from the obverse surface and as a projection when viewed from the reverse surface. The panel body 31 is broken from the obverse surface along the break guide 35A so as to easily form the audio unit mount opening 37A (see FIG. 12) corresponding to the shape of the audio unit 41 (see FIG. 2). The break guide 35A is provided as a rib projecting in the anteroposterior direction. The break guide 35A not broken can enhance surface rigidity of the panel body 31.

As shown in FIG. 9, the break guide 35B is provided as a groove portion in the obverse surface 31a of the panel body 31, and the panel body 31 is thus made thinner at the groove portion than the peripheral portions. The panel body 31 can be broken more easily along the groove portion, so as to easily form the switch mount opening 37B (see FIG. 11) corresponding to the substantially rectangular switch 42 (see FIG. 2).

As shown in FIG. 10, the break guide 35C is provided as a groove portion in the reverse surface 31b of the panel body 31, and the panel body 31 is thus made thinner at the groove portion than the peripheral portions. Similarly to the break guide 35B, the panel body 31 can be broken more easily along the groove portion, so as to easily form the auxiliary connector mount opening 37C (indicated by broken lines in FIG. 10) corresponding to the auxiliary connector. The break guide 35C appears only on the reverse surface 31b as the groove portion, and does not appear on the obverse surface 31a. The break guide 35C located in the rather right portion of the panel body 31 can be thus prevented from appearing on the obverse surface 31a, so as to be harmless to outer appearance of the panel body 31.

Figure 11:
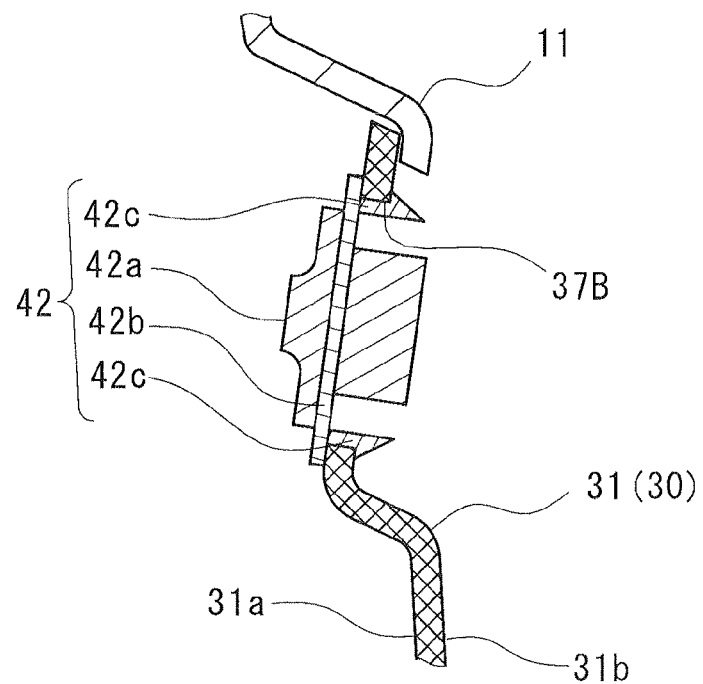
FIG. 11 is a sectional view taken along line XI-XI indicated in FIG. 2.

Mounting of the accessories 40 to the accessory mount panel 30 is described next. Mounting of the switch 42 to the panel body 31 is described with reference to FIG. 11. FIG. 11 is a longitudinal sectional view taken along line XI-XI indicated in FIG. 2, showing a mounted state of the switch 42 to the panel body 31. As shown in FIG. 11, the switch 42 includes a switch body 42a, a flange 42b, and a claw 42c.

The panel body 31 is detached from the dashboard 11 and is broken along the break guide 35B (see FIG. 9) to form the penetrating switch mount opening 37B. The switch 42 is then inserted to the switch mount opening 37B so as to have the flange 42b come into contact with the obverse surface 31a of the panel body 31. The claw 42c is locked to the peripheral edge of the switch mount opening 37B in this state. The switch 42 can be thus detachably mounted to the panel body 31. The accessory mount panel 30 mounted with the switch 42 is attached to the dashboard 11 in this state, so that the switch 42 is mounted to the dashboard 11 via the accessory mount panel 30.

Figure 12:
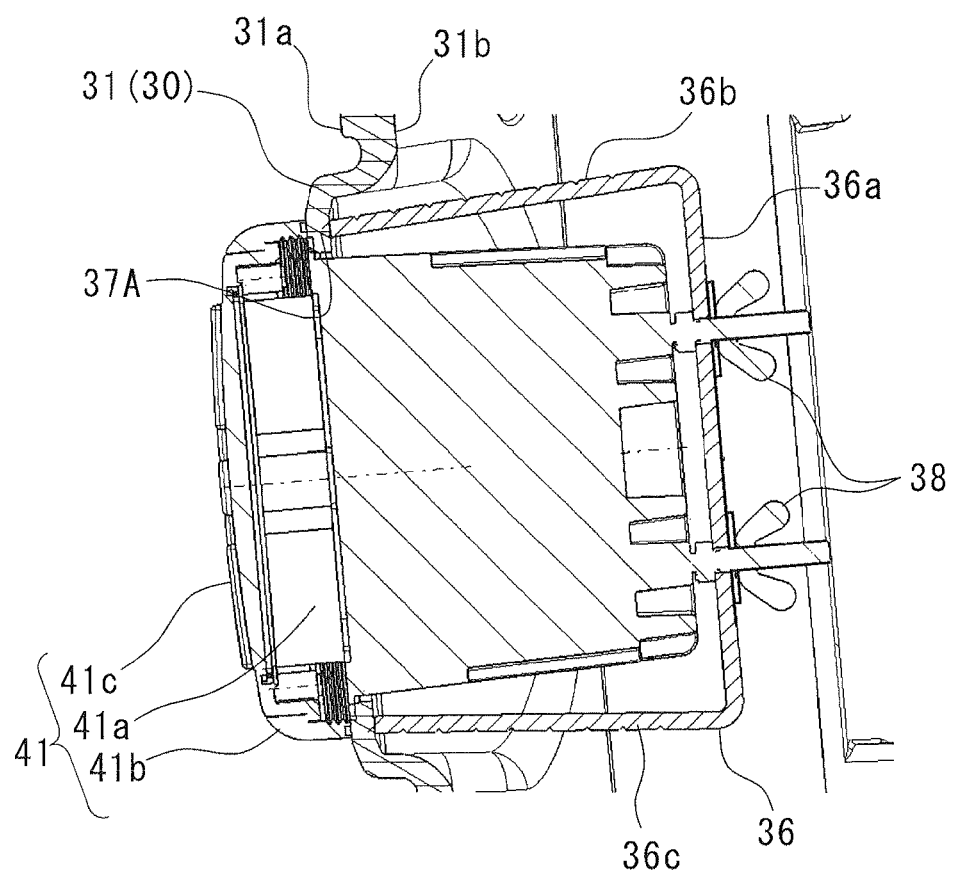
FIG. 12 is a sectional view taken along line XII-XII indicated in FIG. 2.

Mounting of the audio unit 41 to the panel body 31 is described next. FIG. 12 is a longitudinal sectional view taken along line XII-XII indicated in FIG. 2, showing a mounted state of the audio unit 41 to the panel body 31. As shown in FIG. 12, the audio unit 41 has an audio body 41a in a substantially cylindrical shape, and a flange 41b larger in diameter than the audio body 41a. The flange 41b of the audio unit 41 mounted to the panel body 31 is located close to the riding space. The flange 41b is provided, on the rear surface, with a controller 41c (see also FIG. 2) configured to control the audio unit 41.

As described above, the panel body 31 is broken along the break guide 35A (see FIG. 8) to form the penetrating audio unit mount opening 37A (accessory mount opening) serving as an accessory mount portion. The audio body 41a is inserted to the audio unit mount opening 37A from the obverse surface 31a of the panel body 31, so as to have the back surface (the end surface facing the front chamber 15) of the flange 41b come into contact with the obverse surface 31a of the panel body 31. A mount bracket 36 is attached to the audio body 41a from the reverse surface 31b of the panel body 31 in this state, so as to fix the audio unit 41 to the audio unit mount opening 37A.

Specific description is made with reference also to FIG. 4. The mount bracket 36 is a plate member, and has a first portion 36a in contact with the front end surface of the audio unit 41, a second portion 36b and a third portion 36c bent backward at acute angles from the right and left ends of the first portion 36a. The first portion 36a extends from the right to the left within a plane perpendicular to the axis of the audio unit 41, and is fixed to the front end surface of the audio unit 41 by fasteners 38 (e.g. thumb screws).

In the state where the mount bracket 36 is fixed to the audio unit 41, the rear ends of the second portion 36b and the third portion 36c are made in contact with the reverse surface 31b of the panel body 31. In other words, the panel body 31 is sandwiched between the flange 41b of the audio unit 41 and the rear ends of the mount bracket 36 in the thickness direction. The heavy audio unit 41 can be thus mounted firmly to the panel body 31.

As described above, the accessory 40 of any kind can be mounted to the dashboard 11 via the accessory mount panel 30. The accessory mount panel 30 is detachably provided to the dashboard 11. The accessory 40 of any kind can be mounted to the accessory mount panel 30 that is detached from the dashboard 11, and the dashboard 11 needs not be detached and attached from and to the vehicle.

The accessory mounting structure to the vehicle dashboard thus configured can achieve the following effects.

(1) The accessory 40 of any kind can be mounted via the accessory mount panel 30 that is detachably provided to the dashboard 11. The dashboard 11 thus needs not be detached and attached from and to the vehicle. This configuration can improve workability of mounting the accessory 40.

(2) A plurality of accessories 40 required by each user can be selectively added to the accessory mount panel 30. The accessory mount openings corresponding to the kinds of the accessories 40 need not be preliminarily provided at a plurality of positions on the dashboard 11, and no opening cover needs to be provided for closing the accessory mount openings. This configuration prevents increase in cost. In other words, the accessory mount openings are not opened when the accessories 40 are not mounted, with no need to prepare separately opening covers.

(3) The panel body 31 can be easily provided with the accessory mount portions to be mounted with the accessories 40 as the accessory mount openings 37A to 37C that are formed by breaking the accessory mount panel 30 along the break guides 35A to 35C.

(4) The accessory mount panel 30 is made of resin and can be thus easily broken along the break guides 35A to 35C so as to easily provide the accessory mount openings 37.

(5) The break guide 35C appears only on the reverse surface 31b of the panel body 31 as a groove portion, and does not appear on the obverse surface 31a facing the riding space S1. The break guide 35C located in the rather right portion of the panel body 31 can be thus prevented from appearing on the obverse surface, so as to be harmless to outer appearance of the panel body 31.

(6) The flange 41b and the mount bracket 36 sandwich the panel body 31 in the thickness direction, and the heavy audio unit 41 can be thus mounted firmly to the panel body 31.

(7) The accessory mount panel 30 can be detachably attached to the periphery of the opening 11a in the dashboard 11 via the engagement portions 33.

(8) The frame 32 improves rigidity of the accessory mount panel 30. Furthermore, the frame 32 is attached to the periphery of the center console 21 by engagement at the engagement portions 33. This configuration increases the number of the engagement portions 33 of the accessory mount panel 30 to the dashboard 11. The accessory mount panel 30 can be thus attached more firmly to the dashboard 11.

(9) In addition to the engagement portions 33, the panel body 31 is fastened to the rear boss 11c of the dashboard 11 by the tapping screw 39, so that the accessory mount panel 30 is attached more firmly to the dashboard 11. This configuration reinforces attachment of the accessory mount panel 30 mounted with the heavy audio unit 41 to the dashboard 11.

The break guides according to the above embodiment are provided as recess portions or groove portions. The break guides are not limited to these but have only to be provided so as to guide breaking corresponding to the mounting shapes of the accessories. More specifically, the break guides can be provided not as recess portions or groove portion but as perforated openings that intermittently penetrate along the mounting shapes of the accessories. The accessory mount panel can be more easily broken along the break guides so as to easily provide the accessory mount openings. The accessory mount panel can be alternatively provided with broken lines corresponding to the mounting shapes of the accessories as the break guides.

The tapping screw 39 is provided as a reinforcer for reinforcing attachment of the accessory mount panel 30 to the dashboard 11 by the clip in the above embodiment. Alternatively, the tapping screw 39 may not be utilized as the reinforcer but the tapping screw 39 in place of the clip can detachably fix the accessory mount panel 30 to the dashboard 11.

Still alternatively, push rivets can be provided as the engagement portions configured to detachably attach the accessory mount panel 30 to the dashboard 11. The push rivets each include a rivet body and a pin slidably pushed into the rivet body. The distal end of the rivet body is expanded when the pin is pushed into the rivet body that penetrates the accessory mount panel 30 and the dashboard 11. The expanded portion and the head of the rivet fasten the accessory mount panel 30 and the dashboard 11.

The present invention can be modified or changed in various manners without departing from the spirit and scope of the present invention recited in the following claims.

What is claimed is:

1. An accessory mounting structure to a vehicle dashboard, the structure comprising:
    a dashboard extending in a vehicle width direction at a front portion of a riding space and provided with an accessory location opening for locating an accessory; and
    an accessory mount panel detachably provided to the dashboard and closing the accessory location opening; wherein
    the accessory mount panel has a break guide configured to form an accessory mount opening by being broken along the break guide, and the accessory can be mounted to a portion of the accessory mount panel adjacent a periphery of the accessory mount opening.

2. The accessory mounting structure to the vehicle dashboard according to claim 1, wherein the accessory mount panel is made of resin.

3. The accessory mounting structure to the vehicle dashboard according to claim 1, wherein the break guide is provided on a reverse surface of the accessory mount panel, opposite to a obverse surface facing the riding space.

4. The accessory mounting structure to the vehicle dashboard according to claim 1, the structure further comprising:
    a mount bracket configured to mount the accessory to the accessory mount panel; wherein
    the accessory being mounted to the accessory mount panel has a flange that is located on the obverse surface facing the riding space and is larger than the accessory mount opening, and the accessory is mounted to the accessory mount panel when the flange and the mount bracket sandwich the accessory mount panel in a thickness direction.

5. The accessory mounting structure to the vehicle dashboard according to claim 1, wherein the accessory mount panel is attached, by engagement at an engagement portion, to a periphery of the accessory location opening.

6. The accessory mounting structure to the vehicle dashboard according to claim 5, wherein:
   the dashboard has a center console provided adjacent to the accessory mount panel; and
   the accessory mount panel has a frame surrounding the center console and attached, by engagement at an engagement portion, to a periphery of the center console.

7. The accessory mounting structure to the vehicle dashboard according to claim 1, wherein:
   the dashboard has a rear boss on a reverse surface opposite to a obverse surface facing the riding space; and
   the accessory mount panel is further fastened by a screw to the rear boss.

* * * * *